Dec. 30, 1924.　　　　　W. K. LINDEMAN, SR　　　　　1,521,451
ANTISKIDDING DEVICE
Filed Aug. 7, 1924
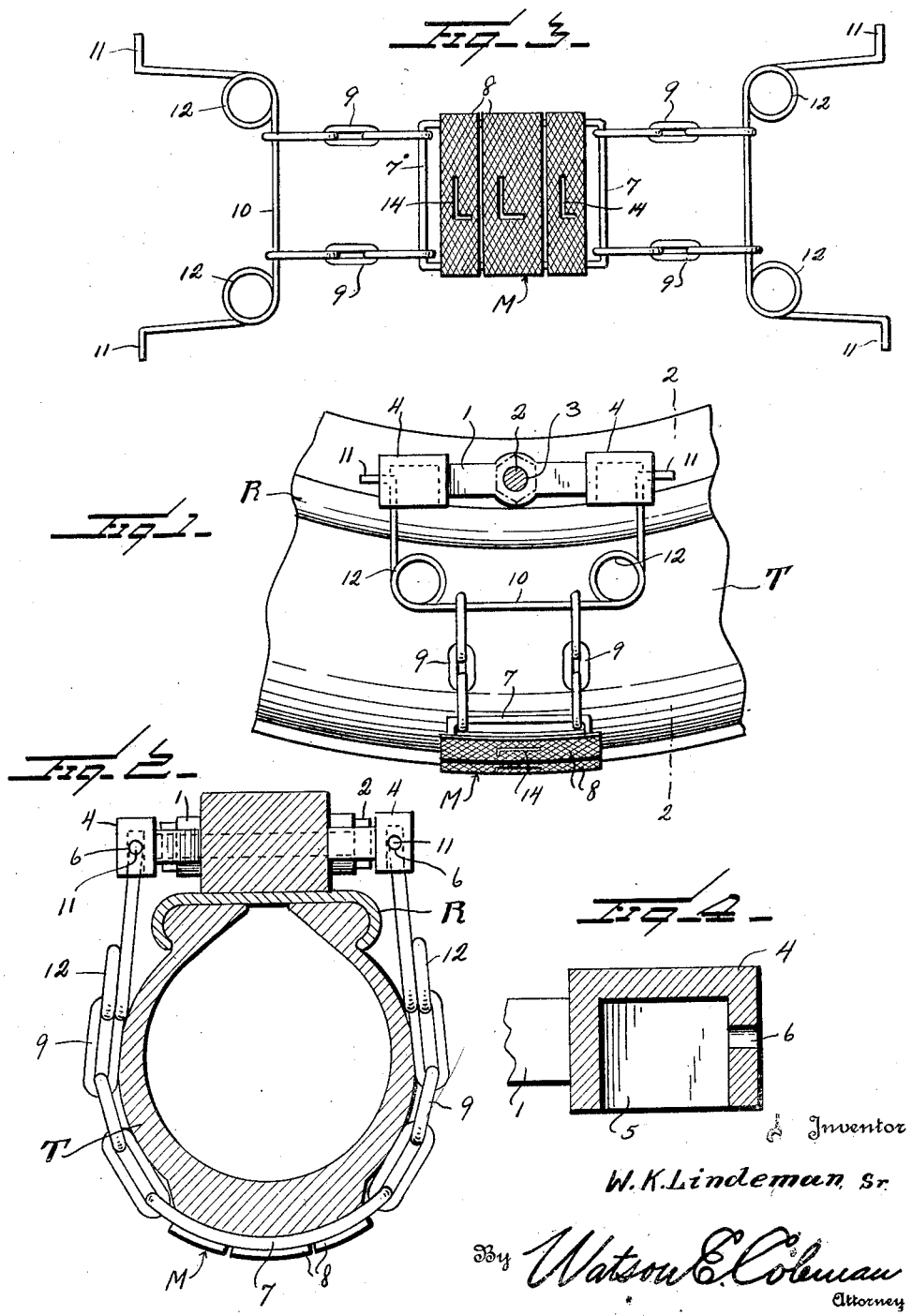
Inventor
W. K. Lindeman, Sr.
By Watson E. Coleman
Attorney Patented Dec. 30, 1924.

1,521,451

UNITED STATES PATENT OFFICE.

WILLIAM KARL LINDEMAN, SR., OF PHILADELPHIA, PENNSYLVANIA.

ANTISKIDDING DEVICE.

Application filed August 7, 1924. Serial No. 730,683.

*To all whom it may concern:*

Be it known that I, WILLIAM K. LINDEMAN, Sr., a citizen of the United States, residing at Philadelphia, in the county of Philadelphia and State of Pennsylvania, have invented certain new and useful Improvements in Antiskidding Devices, of which the following is a specification, reference being had to the accompanying drawings.

This invention relates to certain improvements in anti-skidding devices and it is an object of the invention to provide a device of this character with novel and improved means whereby the same may be readily and conveniently applied in working position or removed without the necessity of jacking up the wheel.

It is also an object of the invention to provide a novel and improved device of this general character wherein a holding member is carried at opposite sides of a wheel together with a tread member provided with means for detachable connection with said holding members.

The invention consists in the details of construction and in the combination and arrangement of the several parts of my improved anti-skidding device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein—

Figure 1 is a view in side elevation illustrating an anti-skidding device constructed in accordance with an embodiment of my invention and in applied position;

Figure 2 is a sectional view taken substantially on the line 2—2 of Figure 1;

Figure 3 is a view in plan of my improved device as herein disclosed unapplied;

Figure 4 is an enlarged fragmentary view of an end portion of one of the elongated members or brackets.

As herein disclosed, my improved anti-skidding device comprises a pair of elongated members or brackets 1 adapted to be held at the opposite sides of a wheel by a rim bolt 2, the central portions of said members or brackets 1 being each provided with an opening 3 through which said bolt projects.

The outer extremity of each of the members or brackets 1 is provided with a head or block 4 provided in one side with a pocket or recess 5 the open end of which being disposed toward the rim R when the members or brackets 1 are in applied position. The outer end wall of each of the pockets 5 is provided with an opening or recess 6 for a purpose to be hereinafter more particularly referred to.

The tread member M comprises a substantially rectangular frame 7 disposed on a curvature to closely conform to the tread portion of the tire T to which it is applied. The side members of the frame 7 are connected by the plates 8 also preferably curved to conform to the adjacent portion of the tire to which the device is applied, said plates being produced from rust-proof steel and having their outer surfaces serrated or otherwise roughened to increase the traction facility thereof. The frame 7 extends beyond each end plate 8 to provide a loop with which is engaged the chains or flexible members 9 also operatively engaged with the intermediate portion of a substantially U-shaped bracket 10 the side arms of which terminate in the outwardly directed extensions 11. The inner portions of the side arms are connected to the intermediate portion of the bracket by the coils 12 whereby said bracket is expansible. When it is desired to apply the tread member to the tire T it is only necessary to retract the side members of one of the brackets 10 sufficiently to permit the extensions 11 thereof to be inserted within the pockets or recesses 5 and to engage within the openings 6 of one of the brackets or members 1 and then to similarly attach the other bracket 10 to the second member or bracket 1. By this means the device may be readily and conveniently applied in working position without the necessity of jacking up the wheel. It is also to be understood that the device can be removed with equal facility.

The central portion of each of the plates 8 is provided with an opening 14 of any desired configuration.

From the foregoing description it is thought to be obvious that an anti-skidding device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An anti-skid device comprising members, means for attaching the same to the opposite sides of a wheel, each of said members being provided at its extremities with pockets, a wall of each of the pockets being provided with a recess, resilient brackets having their extremities insertible within the pockets of the members and engageable with the recesses to hold the brackets to said members, a tread member, and means for connecting the tread member to the brackets.

2. An anti-skidding device comprising members, means for attaching the same to the opposite sides of a wheel, each of said members being provided at its extremities with recesses, resilient brackets having their extremities engageable within the recesses to hold the brackets to said members, a tread member, and means for connecting the tread member to the brackets.

In testimony whereof I hereunto affix my signature.

WILLIAM KARL LINDEMAN, Sr.